Figure 1:
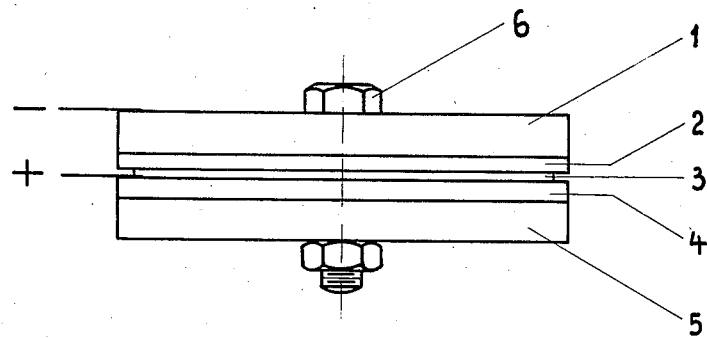

Sept. 12, 1933.  E. PRESSER  1,926,884

ELECTRIC RECTIFIER

Filed May 21, 1929

INVENTOR:
Ernst Presser

Patented Sept. 12, 1933

1,926,884

UNITED STATES PATENT OFFICE 1,926,884

ELECTRIC RECTIFIER

Ernst Presser, Nuremberg, Germany, assignor, by mesne assignments, to Western Electric Company, Incorporated, New York, N. Y., a corporation of New York Application May 21, 1929, Serial No. 364,952, and in Germany August 8, 1928

21 Claims. (Cl. 175—366)

The present invention relates to electric rectifiers of the dry type, in which a thin metallic rectifying layer, which may consist, for example, of metallic selenium or tellurium, is provided between two plate-like metal electrodes.

The invention is mainly applicable to those rectifiers in which the rectifying layer is intimately connected with one of the electrodes, the other electrode, which may be of lead or bismuth, being only pressed mechanically on to the said rectifying layer. The electrode with which the rectifying layer is intimately connected may consist for instance of iron or nickel.

This invention consists in this, that small quantities of other substances are added to the material of the rectifying layer. Metal compounds, for example, have proved to be suitable additions.

The addition of the metal compounds to the material of the rectifying layer may be effected by directly mixing the metal compound concerned, e. g. a metal selenide, with the material of the rectifying layer. For this purpose the metal compounds are preferably pulverized. If the material of the rectifying layer consists of selenium, it may be in the metalloid state during the mixing. Subsequently the same is converted into the metallic state according to one of the known methods, and it then contains the previously added selenides in the unchanged state.

The addition of the metal compounds to the material of the rectifying layer, may, for instance, also be effected in such a manner that the metal concerned is added to the pulverized material of the rectifying layer in comparatively small quantity in the form of metal dust. Thereupon, the said pulverized material is heated to a temperature above its melting point, when the added metal dust combines chemically with the material of the rectifying layer. If this layer consists of selenium, for example, then, after the mass has cooled, the added metals are contained in the solid selenium layer in the form of the corresponding selenides.

It has been found that the compounds of the metals of the iron group are particularly suitable for the present purpose. Of these metals, nickel and cobalt are pre-eminently suitable, since the addition of their compounds to the material of the rectifying layer effects a considerable increase in the efficiency per unit surface of the rectifier. Furthermore, the compounds of these metals are already very effective in small quantity.

The quantity of added metal compounds which is suitable depends on the purpose for which the rectifier is to be used and on the nature of the metal used.

Thus, for instance, by using nickel selenide a very considerable effect is already obtained with an addition of $\frac{1}{10}$ per cent.

It has also been found that a considerable increase in the efficiency of these rectifiers may be produced if small quantities of earth metals are added to the layer. At the same time, the ratio of the resistances in the two directions of the current is thereby considerably increased, i. e. the rectifying action is improved.

Very small additions of earth metals to the material of the layer suffice to produce this effect. In practice, additions of less than 2% are usually used. Naturally, the quantity of earth metal to be added may vary according to the different character of the rectifying layer.

The rectifying effect is so improved by the present invention, that, for example, with an E. M. F. of 4 volts, the ratio between the resistances in the two directions of the current is about 1:1000.

Thorium, zirconium and cerium have proved to be favourable earth metal additions. These metals offer this particular advantage, that, when they are used a rectifying layer is formed, which is very insensitive to atmospheric influences.

The addition of several earth metals together to the rectifying layer, instead of only one such metal, also comes within the scope of the invention.

The addition of the earth metals to the material of the rectifying layer may be effected, for instance, by fusing the material of the layer and adding the earth metals to the liquid material, whereupon the mixture is applied to one of the two electrodes of the rectifier.

When the rectifying layer consists of metallic selenium the earth metals may be added to fused selenium. The selenium is then in its metalloid modification. For the formation of the rectifying layer however, it is then converted into the metallic form and it then contains in this metallic modification the previously added earth metals. It is immaterial for the invention whether the combination of the earth metals with the material of the rectifying layer is a mechanical mixture, an alloy or a chemical compound.

Sulphur, also, has proved to be suitable as addition to the metallic rectifying layers.

The sulphur may be mixed with the selenium, for instance, by dissolving the sulphur in fused selenium. The mass so obtained is then used for preparing the rectifying layer.

Very small quantities of sulphur have already a very great effect. It has been found that the rectifier works particularly well when the sulphur addition amounts to 5% or less. For example, a very good effect is obtained with ½% of sulphur. The effect of the addition of sulphur is also apparent when the layer contains other, intentional or unintentional additions.

It has also been found that, in dry rectifiers with a layer of metallic selenium, the rectifying effect and the efficiency of the apparatus may be considerably increased if a small quantity of alkali-metals is added to the material of the rectifying layer.

The addition of alkali metals has to be borne in mind when choosing the material for the rectifying layer, which may contain the requisite quantity of alkali metal already in its crude state or in consequence of a suitable method of preparation.

Sodium and lithium have proved to be preeminently suitable among the alkali metals.

The quantity of alkali metals which is to be added depends both on the nature of the rectifying layer and on the nature of the alkali metal to be chosen. It has been found that the most favourable effect is obtained with additions of 5% and less.

The alkali metal addition may, of course, consist of several alkali metals.

Two arrangements for carrying the invention into effect are illustrated, by way of example, in the accompanying drawing.

In Figure 1, 1 is a plate electrode of metal on which the metallic rectifying layer 2 is provided, which layer may consist of metallic selenium or tellurium. Against the rectifying layer abuts the thin plate electrode 3 of metal. The latter is firmly pressed against the rectifying layer through the intermediary of an intermediate elastic layer 4 which may consist, for instance, of rubber, by means of a pressure plate 5 and screw bolt 6 which passes through all the plates being installed insulated therefrom. The connecting terminals of this rectifying instrument are provided on the wires indicated by + and − which are connected to the plates 3 and 1 respectively.

Figure 2:
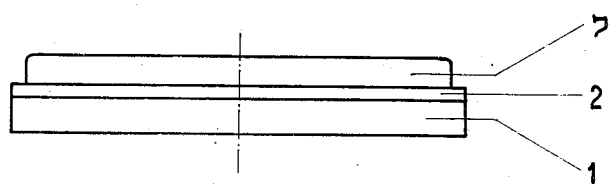

In the arrangement shown in Figure 2 the metallic rectifying layer is provided on the plate electrode and is intimately connected therewith. On the rectifying layer 2 is the second plate electrode 7 which is cast thereon, and which may for instance consist of a metal which fuses at a low temperature. In the manufacture of the rectifier the metal referred to is placed in a liquid state on the rectifying layer 2 on which it hardens and forms the second electrode.

What I claim is:

1. A dry rectifier for electric currents having plate-like metallic electrodes, one of which comprises a metal of the iron group and the other a metal of the group consisting of lead and bismuth, and a thin metallic rectifying layer of an element of the sulphur group between said electrodes, the said rectifying layer containing a small quantity of a metallic substance.

2. A dry rectifier for electric currents having plate-like metallic electrodes, one of which comprises a metal of the iron group and the other a metal of the group consisting of lead and bismuth, and a thin rectifying layer of metallic selenium between said electrodes, the said rectifying layer containing a small quantity of a metallic substance.

3. A dry rectifier for electric currents having plate-like metallic electrodes, one of which comprises a metal of the iron group and the other a metal of the group consisting of lead and bismuth, and a thin rectifying layer of an element of the sulphur group between said electrodes, the said rectifying layer containing a small quantity of a metal selenide.

4. A dry rectifier for electric currents having plate-like metallic electrodes, one of which comprises a metal of the iron group and the other a metal of the group consisting of lead and bismuth, and a thin metallic rectifying layer of an element of the sulphur group between said electrodes, the said rectifying layer containing small quantities of a metal compound of the iron group.

5. A dry rectifier for electric currents having plate-like metallic electrodes, one of which comprises a metal of the iron group and the other a metal of the group consisting of lead and bismuth, and a thin metallic rectifying layer of an element of the sulphur group between said electrodes, the said rectifying layer containing a small quantity of selenide of a metal of the iron group.

6. A dry rectifier for electric currents having plate-like metallic electrodes, one of which comprises a metal of the iron group and the other a metal of the group consisting of lead and bismuth, and a thin metallic rectifying layer of an element of the sulphur group between said electrodes, the said rectifying layer containing a small quantity of nickel selenide.

7. A dry rectifier for electric currents having plate-like metallic electrodes, one of which comprises a metal of the iron group and the other a metal of the group consisting of lead and bismuth, and a thin metallic rectifying layer of an element of the sulphur group between said electrodes, the said rectifying layer containing a small quantity of an earth metal.

8. A dry rectifier for electric currents having plate-like metallic electrodes, one of which comprises a metal of the iron group and the other a metal of the group consisting of lead and bismuth, and a thin metallic rectifying layer of an element of the sulphur group between said electrodes, the said rectifying layer containing a small quantity of a selenide of an earth metal.

9. A dry rectifier for electric currents having plate-like metallic electrodes, one of which comprises a metal of the iron group and the other a metal of the group consisting of lead and bismuth, and a thin metallic rectifying layer of an element of the sulphur group between said electrodes, the said rectifying layer containing a small quantity of zirconium.

10. A dry rectifier for electric currents having plate-like metallic electrodes, one of which comprises a metal of the iron group and the other a metal of the group consisting of lead and bismuth, and a thin metallic rectifying layer of an element of the sulphur group between said electrodes, the said rectifying layer containing a small quantity of zirconium selenide.

11. An electric current rectifier of the type having an electrode of a metal of the iron group, an electrode of a metal of the group consisting of lead and bismuth, and a rectifying layer between said electrodes, said layer being of an element of the sulphur group in the elementary state having a metal as well as a non-metal character, said layer containing a metal of another group.

12. An electric current rectifier of the type having an electrode of a metal of the iron group, an electrode of a metal of the group consisting of lead and bismuth, and a rectifying layer between said electrodes, said layer being of an element of the sulphur group in the elementary state having a metal as well as a non-metal character, said layer containing a metallic compound of said sulphur group element.

13. An electric current rectifier of the type having an electrode of a metal of the iron group, an electrode of a metal of the group consisting of lead and bismuth, and a rectifying layer between said electrodes, said layer being of an element of the sulphur group in the elementary state having a metal as well as a non-metal character, said layer containing a compound of a metal of the iron group and said sulphur group element.

14. An electric current rectifier of the type having a rectifying layer of selenium, an electrode of an iron group metal, and an electrode of a metal of the group consisting of lead and bismuth, said selenium layer containing a metallic selenide.

15. An electric current rectifier of the type having a rectifying layer of selenium, an electrode of an iron group metal, and an electrode of a metal of the group consisting of lead and bismuth, said layer containing a compound of a metal of the iron group and selenium.

16. An electric current rectifier of the type having a rectifying layer of selenium, an electrode of an iron group metal, and an electrode of a metal of the group consisting of lead and bismuth, said layer containing a selenide of nickel.

17. An electric current rectifier of the type having a rectifying layer of selenium, an electrode of an iron group metal, and an electrode of a metal of the group consisting of lead and bismuth, said layer containing approximately one-tenth per cent. of nickel selenide.

18. An electric current rectifier of the type having an electrode of a metal of the iron group, an electrode of a metal of the group consisting of lead and bismuth, and a rectifying layer between said electrodes, said layer being of an element of the sulphur group in the elementary state having a metal as well as a non-metal character, said layer containing an earth metal.

19. An electric current rectifier of the type having an electrode of a metal of the iron group, an electrode of a metal of the group consisting of lead and bismuth, and a rectifying layer between said electrodes, said layer being of an element of the sulphur group in the elementary state having a metal as well as a non-metal character, said layer containing a compound of a metal of the earth metal group and said sulphur group element.

20. An electric current rectifier of the type having a rectifying layer of selenium, an electrode of an iron group metal, and an electrode of a metal of the group consisting of lead and bismuth, said layer containing an earth metal.

21. An electric current rectifier of the type having a rectifying layer of selenium, an electrode of an iron group metal, and an electrode of a metal of the group consisting of lead and bismuth, said layer containing an earth metal selenide.

ERNST PRESSER.